Nov. 16, 1954     R. E. SCHWARTZ     2,694,660

FIBER GLASS MAT

Filed Feb. 1, 1952

RALPH E. SCHWARTZ,
INVENTOR.

BY

ATTORNEY

United States Patent Office 2,694,660
Patented Nov. 16, 1954

2,694,660

FIBER GLASS MAT

Ralph E. Schwartz, Hollywood, Calif., assignor to Vibradamp Corporation, Los Angeles, Calif., a corporation of California Application February 1, 1952, Serial No. 269,431

2 Claims. (Cl. 154—54)

My present invention relates to mats composed of glass fibers which are bound together by a binder material, and more particularly to my novel method of heat treating these mats of glass fibers and to the resultant product of my novel heat treating method.

It is a common practice in the prior art of making glass fiber mats to cure, or polymerize the binder material which holds the glass fibers in the mat form. During this prior art curing process the binder material becomes hard and brittle and it tends to concentrate at the juncture points between adjacent, contacting glass fibers. Both of these characteristics greatly limit the load-deflection and fatigue characteristics of the finished mat.

It is therefore an object of my present invention to produce a glass fiber mat that is bound together by a binder material which is pliable and not brittle.

Another object of my present invention is to produce a mat of glass fibers that is so bound together by a binder material that the majority of said binder material is disposed between the individual glass fibers and is not concentrated at the glass fiber juncture points.

A further object of my present invention is to produce a mat of glass fibers which is bound together by a partially polymerized binder material.

Another object of my invention is to produce a mat of glass fibers bound together by a binder material which has been partially cured so as to attain a static condition.

An additional object of my present invention is to produce a mat of glass fibers which is bound together by a binder material that has been heated sufficiently to cause it to flow along the glass fibers, but from which the heat has been removed or reduced before said binder material became completely polymerized or before the majority of said binder material flowed far enough along the glass fibers to concentrate at the glass fiber juncture points.

Another object of my present invention is to produce a glass fiber mat of the character described which has excellent load-deflection and fatigue characteristics, and which may be subjected to great stresses without crumbling.

A still further object of my present invention is to produce a mat of glass fibers which is so bound together by a binder material that the majority of the adjacent glass fibers which are normally not in contact with each other have some binder material between them so that when the mat is compressed to bring these adjacent fibers toward each other, there will be some binder material to form a pad, or cushion between most of the adjacent fibers in order to prevent them from contacting and fracturing each other.

Another object of my present invention is to provide a method of heat treating a mat of glass fibers or a laminated mat made of stacked individual mats of glass fibers in order to produce a completed glass fiber material of the character described.

Still another object of my invention is to provide a method of producing a single mat of glass fibers which has any desired density.

Other objects and advantages of my invention will be apparent from the following description and claims, the novelty consisting in the features of construction, combination of parts, the unique relations of the members, the relative proportioning, disposition and operation thereof, and the procedural steps employed in connection therewith, all as is more completely outlined herein and as is particularly pointed out in the appended claims.

In the drawings, which form a part of the present specification:

Figure 1:
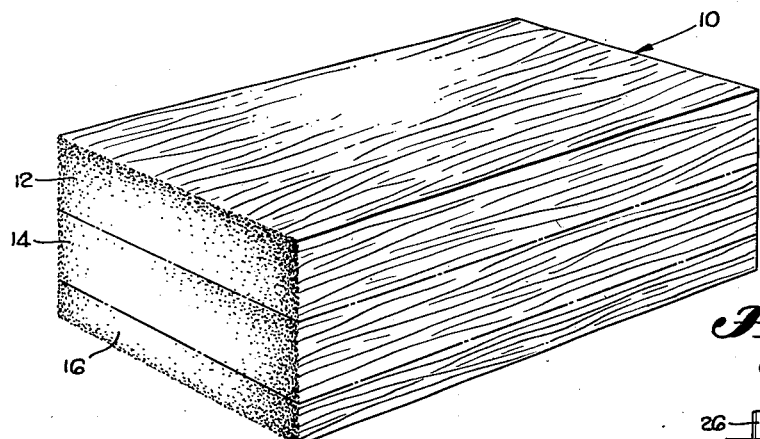
Figure 1 is a perspective view of a mat of glass fibers which is to be heat treated in accordance with my present invention.
Figure 2:
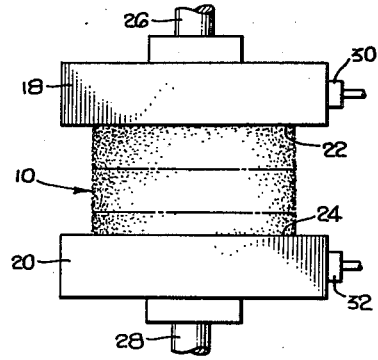
Figure 2 is a side elevation of my mat operatively engaged in my heating and pressurizing apparatus.

Referring to the drawings, I provide a mat 10 of glass fibers which are bound together by a binder material. Mat 10 may comprise either a single, integral mat, such as one of the mats described in my concurrently filed co-pending application, Serial Number 269,433, entitled "Mat of Glass Fibers and Method of Making Same," or the mat 10 may comprise a laminated mat produced from a plurality of stacked individual mats such as individual mats 12, 14 and 16, which are joined together as shown in Figure 1. Such a laminated mat and the method of making the same are described in my concurrently filed co-pending application for "Stacking Fiber Glass Mats," Serial Number 269,432. Regardless of whether or not the mat is laminated, I shall hereinafter refer to it simply as mat 10.

Although any glass fibers may be used to form the mat 10, the preferred fibers are "secondary fibers" such as those which are described in my aforesaid patent application Serial No. 269,433, the said secondary fibers being preferably made by subjecting primary fibers to a hot gaseous stream of high velocity.

The binder material which is used in my mat 10 is applied to the fibers within the mat during the mat formation, and may be any one of a wide variety of substances. All thermo-setting plastics are suitable binders. This group includes, but is not limited to, all of the polyesters, all of the phenols, all of the urea formaldehydes, all of the vinyls, all silicones and combinations of any of these.

The binder material in the mat 10 which is to be processed in accordance with my present invention is substantially completely uncured, that is, unpolymerized. A thin, surface "skin" of partially polymerized binder on mat 10 is desirable, however, so that the mat 10 will retain substantially the shape in which it was originally formed. A single mat which is thus unpolymerized except for said "skin" as described in my aforesaid co-pending application and a laminated mat which comprises a plurality of these individual mats which are bound together by unpolymerized binder may be used. These uncured mats, such as illustrated at 10, are entirely novel in the art of making glass fiber mats, and wherein the binder material is cured during the formation of the mat.

My mat 10 is placed between a pair of pressure plates 18 and 20, respectively, so that the working surfaces 22 and 24 of my respective pressure plates 18 and 20 operatively engage the flat longitudinal surfaces of mat 10. Pressure is then applied to the pressure plates 18 and 20 through plate supporting members 26 and 28, respectively, and the uncured mat 10 is compressed to the desired thickness and density.

The compressed mat 10 is then subjected to heat, which may be applied by any conventional means. For instance, the heat may be applied to mat 10 by merely heating the pressure plates 18 and 20 by means of a pair of heating elements 30 and 32, respectively, disposed in pressure plates 18 and 20. These heating elements 30 and 32 may be controlled by electricity, gas, steam or any other suitable means.

If the compressed mat 10 has a relatively low density, such as less than 12 lbs. per 144 cubic inches, the mat 10 may alternatively be heated by forcing hot air therethrough. On the other hand, a relatively densely compressed mat 10 may alternatively be heated by a suitable dielectric process. Both of these alternative heating methods are well known in the art, and hence are not shown in the drawings hereof.

The weight per unit of area of the uncompressed mat 10 is determined by three variable factors, namely, the desired final mat density, the desired final mat thickness and the percentage of weight loss due to the removal of moisture from the mat during the heat treating operation.

For example, if the final mat is to have a thickness of one inch, an area of one square foot and a density of six pounds per 144 cubic inches; and if there is a moisture loss of 8% by weight of the mat during the heat treating process, then an uncured mat 10 having an area of one square foot and a total weight of approximately 6.52 pounds must be used, in order that the 8% moisture loss will leave a six pound mat.

Figure 3:
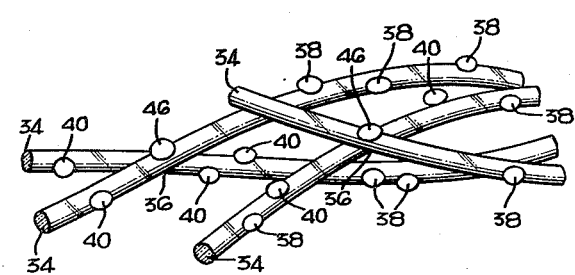
Figure 3 is a greatly enlarged fractional view of several of my glass fibers on which a binder material has been sprayed.

During the formation of mat 10, prior to any heat treatment thereof, a solution of binder material is sprayed on the individual glass fibers of the mat. Figure 3 illustrates the structure of some typical individual glass fibers 34 and the associated uncured binder material after the binder has been applied thereto, but prior to the heat treatment thereof. The binder solution is deposited upon glass fibers 34 in the form of many small droplets.

During the prior art curing process of a mat having binder droplets deposited on the fibers 34 in the manner shown in Figure 3, the mat is heated and the droplets of the binder then flow along the glass fibers 34. As this prior art heating is continued, the moisture is removed from the binder, while at the same time the binder flows along the fibers 34 to the juncture points 36 where a plurality of the adjacent fibers contact each other. This prior art heat treatment is continued until all of the moisture is removed from the binder and substantially all of the binder material has thus concentrated at the juncture points 36. This prior art process causes the binder material to be fully polymerized and brittle.

When a mat which is thus formed by the above prior art process is compacted, the concentrations of brittle binder material at the fiber juncture points 36 tend to crack. Also, the juncture points 36 are made so rigid by these binder concentrations that the fibers themselves break near the juncture points 36 upon compaction of this prior art mat.

An additional problem in connection with these prior art mats is that the glass fibers at points other than juncture points 36 are substantially completely without any protective binder material thereon, so that when adjacent, non-contacting fibers are moved into contact with each other by the compacting of the mat, there is no protective binder pad between these fibers, and the abrasion at the sharp point of contact between the contacting glass fibers will cause one or both of the contacting fibers to break.

Figure 4:
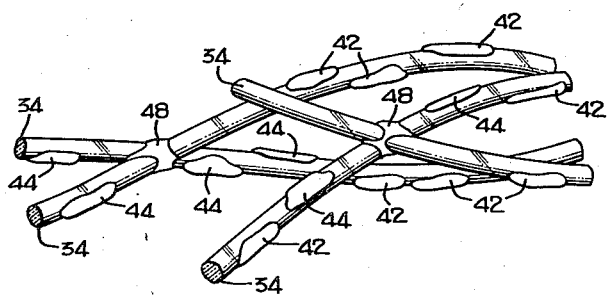
Figure 4 is a view similar to Figure 3 with the binder material partially polymerized in accordance with the present invention.

In carrying out my present invention I apply heat to the mat 10 until the flow point of the binder solution is reached so that the droplets 38 and 40 of binder solution on the glass fibers 34 begin to flow along the fibers 34. I then continue my heating until all of the droplets 38 and 40 shown in Figure 3 which are not at fiber juncture points 36 become smears 42 and 44 of binder on the glass fibers 34 as shown in Figure 4.

However, I arrest my heating before most, if not all, of the droplets 38 and 40 which were not originally sprayed on the juncture points 36 are able to flow to the fiber juncture points 36. Thus, my droplets 40 which are deposited close to the glass fiber juncture points 36 as shown in Figure 3 are transformed into smears of binder material 44 which, though they are also close to the fiber juncture points 36 do not touch or reach them, as is shown in Figure 4, and thus most of my droplets 40 do not flow to the fiber juncture points 36 as do the droplets in the prior art.

Similarly, my droplets 38 of binder material which are sprayed onto the glass fibers 34 at points on the fibers 34 more remote from the fiber juncture points 36 are transformed by my heat treatment into smears 42 of binder material at positions along the glass fibers 34 corresponding to the points of location of binder droplets 38 which are not at the juncture points, as is seen in Figure 3.

Thus, most of the binder material in my heat treated mat 10 will be deposited in smears along the glass fibers 34 at points other than juncture points 36.

A sufficient number of binder droplets 46 will be sprayed onto the glass fiber juncture points 36 as shown in Figure 3 to form a bond or smear 48 between adjacent, contacting glass fibers as shown in Figure 4 when the droplets 46 are heat treated in accordance with my present invention.

In addition to arresting my heat treatment before most of the binder is able to concentrate at the juncture points 36 between adjacent contacting fibers, I reduce my heat before the binder material is fully polymerized. This leaves the binder material in a pliable condition instead of being hard and brittle, so that it will not crack when the mat is flexed. Different percentages of total binder polymerization are best suited for varying ultimate uses of my completed mat 10, so that it is to be understood that my present invention is not restricted to any particular percentage of full polymerization. My present invention includes any degree of polymerization short of total polymerization.

I have found that when my binder material is polymerized to the correct degree for most uses of my mat, reducing of the heat at this time leaves the binder material properly distributed in smears along the fibers 34 as hereinabove described and as is illustrated in Figure 4.

By heating my mat 10 in the manner hereinabove described I partially polymerize my binder material by removing a portion of the water or other liquid in which the binder is dissolved. The degree of polymerization of the binder which results from my heat treatment is therefore determined by the amount of moisture that is removed from the binder, which in turn is fixed by the amount of heating of the mat 10.

Other factors which I consider in achieving the desired degree of polymerization and my proper binder distribution as shown in Figure 4 are the type of glass and the size of the glass fiber. My preferred glass fiber diameter range is from 0.00015 to 0.00025 inch.

Also the quantity ratio of glass fibers to binder must be adjusted correctly in order for the product to be properly polymerized. In the preferred embodiment of my invention the total weight of the binder material comprises less than 30% of the total weight of the completed mat.

One procedure which I follow in producing my mat in which the binder is polymerized to a desirable percentage of total polymerization and in which the binder is properly distributed throughout the fibers, as shown in Figure 4, is to heat my mat until the binder flow point is reached and then to continue the heating until a static condition prior to complete polymerization is reached.

The flow point of any particular binder is readily ascertainable by making tests on the particular binder. The flow point is varied in any binder by mixing additives with the binder. Thus, it is preferable to use a binder which either does not have any additives whatsoever, or which has an exact quantity of a known additive therein. In addition to varying the flow point some additives, such as wetting agents, vary the actual rate of flowing after the flow point has been reached.

When the binder material has reached a static condition prior to complete polymerization the binder has been partially polymerized or partially cured to the extent that no weathering or further heating of the binder will change the structure of the binder, with the exception of further heating at some temperature above a predetermined temperature. Thus, no further aging or evaporation of the binder solvent will take place, and no further polymerization will occur during operational use of the completed product. The predetermined temperature below which no further change in the binder will result is determined by the potential uses of the finished mat, this temperature of necessity being greater than any temperature to which the mat might be subjected in use.

Once the flow point of the binder material has been reached during my heating process the temperature may be retained at the flow point temperature for the necessary time to complete my heating cycle as hereinabove described, or the temperature may be raised to a higher value and the total heating time accordingly reduced. I have found that suitable results are obtained regardless of how much higher the heating cycle temperature is than the flow point temperature, so long as the time during which my mat is heated is correctly correlated to the temperature used.

For example, where my finished mat is to have a density of six pounds per square foot and a thickness of one inch, where my binder material is phenol formaldehyde and where my desired amount of polymerization is 78% of total polymerization, my mat may be heated at a temperature of 350 degrees F. for approximately eight minutes. Substantially the same percentage of total polymerization, and a substantially equally desirable distribution of binder in the fibers, is produced in my same mat with my same binder where I apply a temperature of 400 degrees F. for approximately three and one-half minutes.

The following is one method by which I work out a correct formula in accordance with my invention for any given binder material and type of glass: First, I determine the flow point temperature of my particular binder material. Next, I calculate the exact amount of heating time necessary to achieve full polymerization at the above flow point temperature. Then I determine the percentage of full polymerization which the end uses of my completed mat make the most advisable. Lastly, I determine the length of time during which the flow point temperature is applied to the mat by multiplying the percentage of total polymerization desired by the amount of time which was determined as necessary to achieve full polymerization at the flow point temperature.

One method of testing my completed mat to determine whether or not the desired percentage of total polymerization has been achieved therein is by use of an acetone extraction treatment. This treatment extracts the unpolymerized binder material from my completed mat 10 so that this may be measured, and the percentage of full polymerization may thereby be determined.

Microscopic analysis may be used to determine whether or not my heating cycle has been arrested at the proper time to produce a fiber and binder structure substantially like that shown in Figure 4.

By arresting my heat treatment of mat 10 before the majority of the binder material concentrates at the juncture points 36 between adjacent, contacting fibers 34, my binder bonds 48 between adjacent contacting fibers 34 are made less rigid than similar bonds in prior art mats because of their smaller size. Thus, my fibers 34 which are bound together by binder bonds 48 at juncture points 36 may be flexed relative to each other to a greater degree without fiber breakage than similar bonded fibers in prior art mats.

A further result of my process of reducing the heat from mat 10 before the majority of the binder material concentrates at the juncture points 36 is that most of my binder material remains in my completed mat in the form of smears 42 and 44 on the individual glass fibers 34. By the law of averages, there will be at least one such smear of binder material between most of the adjacent non-contacting fibers in my finished mat. Thus, when my finished mat is compressed during use, and these adjacent non-contacting fibers are brought toward each other, in most instances there will be a smear of binder material which acts as a pliable or resilient pad between these fibers. This binder pad prevents abrasion between these fibers as they are brought toward each other, so that neither of the fibers will break.

By arresting my heating before complete polymerization of my binder material, the binder in my finished mat 10 is made pliable or resilient. This characteristic of my finished mat 10 eliminates the cracking of binder bonds 48 at juncture points 36 between adjacent, contacting fibers 34. The pliability of my binder bonds 48 also permits greater resiliance between fibers 34 which are bound together by binder bonds 48 than is found in prior art mats, and for this reason prevents fibers from breaking near the bonds 48 due to rigidity of bonds 48.

Another advantage of the pliability of the binder material in my completed mat 10 is that the binder material which is disposed along the individual fibers 34 in the form of smears 42 and 44 will not crack when the fibers 34 are bent upon compression of the finished mat 10.

A further advantage of my pliable binder material is that the cushioning effect of the binder smears 42 and 44 when adjacent non-contacting fibers 34 are brought toward each other upon compression of my finished mat 10 is greatly enhanced. This cushioning effect not only prevents glass fiber breakage by spreading the point of contact between these fibers which are brought toward each other over a relatively large area but it directly increases the resilience of my completed mat 10 by permitting the binder smears 42 and 44 to flex when adjacent non-contacting fibers 34 are thus brought toward each other.

All of these above structural characteristics of my completed mat 10 cooperate to produce a mat having unusually good load-deflection and fatigue characteristics. Specifically, the load-deflection and fatigue characteristics of my mat 10 are superior to those of prior art mats primarily for the reason that only a very small number of my glass fibers 34 and my binder bonds 48 will break during operational use of my mat 10.

Another important advantage of my present invention lies in the fact that original mat 10 which is to be heat treated in accordance with my invention is bound together by a binder material which is substantially completely unpolymerized when the mat 10 is compressed and the heating operation is commenced.

By using such a substantially completely unpolymerized mat 10 I am able to compress the mat 10 down to any desired density without disturbing the uniformity of the glass fiber and binder distribution in the mat. By then applying my hereinabove described heat treatment to the already compacted mat while the mat is in the compacted state between pressure plates 18 and 20 the thickness of mat 10 is permanently fixed as the separation between plates 18 and 20, and hence the desired density, whatever it may be, is also permanently fixed.

My method of compacting the substantially completely uncured mat 10 and then heat treating the mat 10 permits both the thickness and the density of my completed mat 10 to be accurately controlled. On the other hand, the prior art method of curing a mat of glass fibers while the mat is originally being formed does not permit such accurate density and thickness control.

It is to be understood that the form of my invention herein shown and described is my preferred embodiment and that various changes in the shape, size, arrangement of parts and operative steps may be resorted to without departing from the spirit of my invention or the scope of the appended claims.

I claim:

1. In a glass fiber mat which has a spring action, the combination of glass fibers arranged out of parallel relationship, said glass fibers being retained together by a phenol aldehyde thermosetting resin binder which is distributed over the surface of said fibers in the form of smears and at the points where the fibers contact one another, said thermosetting resin being heat cured to approximately 78% of full polymerization, said glass fibers which are disposed in non-parallel relationship being bound together by said resin at their points of intersection to form a spring that will resist compression and expansion, said glass fibers having a diameter of between about 0.00015 and 0.00025-inch.

2. A cold-worked glass fiber mat having high-load deflection and fatigue characteristics, said mat being composed of glass fibers arranged out of parallel relationship, said glass fibers being retained together by a phenol aldehyde thermosetting resin binder which is distributed over the surface of said fibers in the form of smears and at the points where the fibers contact one another, said thermosetting resin being heat-cured to approximately 78% of full polymerization, said glass fibers which are disposed in non-parallel relationship being bound together by said resin at their points of intersection to form a spring that will resist compression and expansion, said glass fibers having a diameter of between about 0.00015 and 0.00025-inch.

References Cited in the file of this patent

UNITED STATES PATENTS

| Number | Name | Date |
|---|---|---|
| 2,335,102 | Bergin | Nov. 23, 1943 |
| 2,349,909 | Meharg | May 30, 1944 |
| 2,489,242 | Slayter et al. | Nov. 22, 1949 |
| 2,544,019 | Heritage | Mar. 6, 1951 |
| 2,566,960 | Philipps | Sept. 4, 1951 |
| 2,569,169 | Heritage | Sept. 25, 1951 |
| 2,600,843 | Bush | June 17, 1952 |
| 2,647,851 | Schwartz | Aug. 4, 1953 |